United States Patent
Tutsch et al.

(10) Patent No.: US 11,328,200 B2
(45) Date of Patent: May 10, 2022

(54) PASSIVE TRANSPONDER HAVING A SHIELD

(71) Applicant: LIFE SCIENCE INKUBATOR BETRIEBS GMBH & CO. KG, Bonn (DE)

(72) Inventors: Fabian Tutsch, Cologne (DE); Divin Varghese, Bonn (DE); Alexej Domnich, Bonn (DE)

(73) Assignee: LIFE SCIENCE INKUBATOR BETRIEBS GMBH & CO. KG, Bonn (DE)

( * ) Notice: Subject to any disclaimer, the term of this patent is extended or adjusted under 35 U.S.C. 154(b) by 0 days.

(21) Appl. No.: 17/041,328

(22) PCT Filed: Mar. 22, 2019

(86) PCT No.: PCT/EP2019/057188
§ 371 (c)(1),
(2) Date: Sep. 24, 2020

(87) PCT Pub. No.: WO2019/185458
PCT Pub. Date: Oct. 3, 2019

(65) Prior Publication Data
US 2021/0019588 A1 Jan. 21, 2021

(30) Foreign Application Priority Data
Mar. 28, 2018 (DE) .................. 10 2018 204 766.9

(51) Int. Cl.
*G06K 19/077* (2006.01)

(52) U.S. Cl.
CPC .............. *G06K 19/07771* (2013.01)

(58) Field of Classification Search
CPC ............................. G06K 19/07771
See application file for complete search history.

(56) References Cited

U.S. PATENT DOCUMENTS

| | | | |
|---|---|---|---|
| 5,248,989 A | 9/1993 | Murdoch | |
| 6,034,651 A | 3/2000 | Enguent | |
| 7,053,854 B2 | 5/2006 | Plettner et al. | |
| 8,597,323 B1 * | 12/2013 | Plaza ............... | A61B 17/12172 606/200 |

(Continued)

FOREIGN PATENT DOCUMENTS

| | | |
|---|---|---|
| DE | 101 49 126 A1 | 4/2003 |
| DE | 102012023445 A1 | 3/2014 |
| EP | 2 668 472 B1 | 8/2017 |

OTHER PUBLICATIONS

U.S. Appl. No. 16/956,567, filed Jun. 20, 2020.

(Continued)

*Primary Examiner* — Seung H Lee
(74) *Attorney, Agent, or Firm* — Leydig, Voit & Mayer, Ltd.

(57) ABSTRACT

The invention relates to a passive transponder having at least one coil, the transponder having an electrically conductive shield which covers the windings of the coil from both sides. A central region of the coil around which the windings are wound is not covered by the shield. In the surfaces, in which the shield covers the windings, the shield has at least one discontinuity by which a current flow in the shield can be prevented.

10 Claims, 5 Drawing Sheets

(56) References Cited

U.S. PATENT DOCUMENTS

| | | | |
|---|---|---|---|
| 10,784,927 B2* | 9/2020 | Yazaki | H01Q 1/02 |
| 10,843,000 B2* | 11/2020 | Ridler | A61N 1/0541 |
| 2005/0104796 A1 | 5/2005 | Plettner et al. | |
| 2015/0302290 A1* | 10/2015 | Saito | G06K 19/07786 |
| | | | 235/488 |
| 2020/0367769 A1 | 11/2020 | Domnich et al. | |

OTHER PUBLICATIONS

U.S. Appl. No. 16/969,166, filed Aug. 11, 2020.
U.S. Appl. No. 17/041,939, filed Sep. 25, 2020.
German Patent Office, Office Action in German Patent Application No. 10 2018 204 766.9 (dated Aug. 16, 2018).
European Patent Office, International Search Report in International Application No. PCT/EP2019/057188 (dated Jun. 26, 2019).
European Patent Office, Written Opinion in International Application No. PCT/EP2019/057188 (dated Jun. 26, 2019).
International Bureau of WIPO, International Preliminary Report on Patentability in International Application No. PCT/EP2019/057188 (dated Sep. 29, 2020).

* cited by examiner

PASSIVE TRANSPONDER HAVING A SHIELD

CROSS-REFERENCE TO RELATED APPLICATIONS

This patent application is the U.S. national phase of International Application No. PCT/EP2019/057188, filed on Mar. 22, 2019, which claims the benefit of German Patent Application No. 10 2018 204 766.9, filed Mar. 28, 2018, the disclosures of which are incorporated herein by reference in their entireties for all purposes.

The invention relates to a passive transponder having at least one coil, the transponder having an electrically conductive shield which covers the turns of the coil from both sides. A central region of the coil, around which the turns are wound, is not covered by the shield. In those areas in which it covers the turns, the shield has at least one interruption, by which a flow of current in the shield can be prevented.

When using electrically passive implants, such as for example a capacitive pressure sensor with electric air coil for detecting propagating pulse waves, poor signal-to-noise ratios occur in inductively coupled extracorporeal systems, inter alia due to the electrical properties of the medium (for example blood). One remedy for this would be to increase the distance of the electrical components (for example electrical leads) of the implant from the medium, but this may be very critical for use in a blood vessel. The implant should in principle be as thin as possible so as not to hinder the blood flow or to generate turbulence as resistance.

When coils are used in the human body or in the blood to establish an inductive coupling between an implanted transponder and an external readout device, the quality factor thereof is dramatically reduced in comparison to when used in air. The parasitic capacitance of the coil also increases. The reduction in the quality factor of the coil is caused by eddy current losses. These lead to losses in the medium in the direct vicinity of the turns, which can then be measured as a reduced quality factor of the coil. The change in parasitic capacitance can be attributed to the dielectric properties of blood, which differ from air.

The reduction in the quality factor is bothersome insofar as it is accompanied by a deterioration in the coupling to the extracorporeal readout coil, and thus the measured signal is greatly attenuated.

The problem addressed by the invention is that of specifying a passive transponder which establishes a better inductive coupling to a readout coil when used in a liquid medium, such as blood for example. The aim is for the thickness of the transponder to be kept small, so as not to hinder a flow of liquid along the transponder.

The problem is solved by the passive transponder described herein. The dependent claims specify advantageous developments of the passive transponder of the invention described herein.

According to the invention, a passive transponder is specified which has at least one coil with one or a plurality of turns wound around a central region. The turns may be formed of one or more conductor tracks wound around the central region.

Advantageously, a turn will be understood to mean a portion of a conductor track which runs once around the central region in full. Advantageously, a conductor track may be wound to form a plurality of turns. The conductor track then runs more than once around the central region in full. The coil may preferably be a flat coil or a cylindrical coil. In the case of a flat coil, the turns extend in a common plane, which may be flat but may also be curved. In the case of a cylindrical coil, the turns are arranged next to one another along a cylinder axis, which may advantageously be rectilinear, so that the cylinder axis extends through center points of the turns. Advantageously, most or all turns of a cylindrical coil have the same diameter. The shape of a cylindrical coil may be understood as a cylinder or cylindrical tube. The two terms are intended to be used synonymously in the context of this document. The cylindrical coil then has an outer surface or outer cylinder surface and an inner surface or cylinder surface. The outer cylinder surface then preferably surrounds the turns, and the inner cylinder surface is preferably surrounded by the turns.

According to the invention, the passive transponder additionally has at least one electrically conductive shield. In this case, the shield is arranged such that it covers two coil surfaces which are located opposite one another in relation to the turns, the opposite coil surfaces each being spanned by the same portions of the turns. The shield thus extends over those regions of the coil in which the coil extends in a planar manner. If the coil is a flat coil, the shield may extend in a planar manner above and below the plane in which the turns of the flat coil extend. If the coil is a cylindrical coil, the shield may extend on the one hand over the outer cylinder surface and on the other hand over the inner cylinder surface.

The coil surfaces spanned by the turns are advantageously to be regarded as those coil surfaces in which the turns or the conductor track of the turns extends in two dimensions. Surfaces spanned by the turns or the conductor tracks may therefore be regarded as those surfaces in relation to which the turns and/or conductor tracks extend parallel.

According to the invention, the shield is configured such that it at least partially does not cover the central region. It can thus be ensured that a magnetic field from outside can induce a current in the turns of the coil. In the case of a flat coil, therefore, the region not covered by the shield is the region around which the conductor tracks extend, but in which no conductor tracks are arranged. In the case of a cylindrical coil, a non-vanishing region around the coil axis is not covered by the shield, which in particular means that the end faces of the cylindrical coil remain open.

The shield may be of single-part or multi-part design. By way of example, it may surround the conductor tracks or may comprise separate constituent parts which are each arranged over one of the opposite coil surfaces.

According to the invention, the shield has at least one interruption in the regions in which it covers one of the coil surfaces. The interruption severs the shield in a direction non-parallel to the course of the turns at the site of the interruption. The conductor tracks thus intersect the interruption at a non-vanishing angle. In this way, a magnetic field which induces a flow of current in the turns does not lead to a flow of current in the shield. The interruption therefore severs the shield such as to prevent a flow of current when a magnetic field which induces a flow of current in the turns is applied. The interruption may be formed by an incision or else by an insert made of dielectric material.

Advantageously, the shield may extend in a ring-shaped manner around the central region. In this case, in the case of the flat coil, the ring may advantageously be severed in the radial direction by the interruption. In the case of a flat coil, the interruption may preferably be perpendicular to the turns at the site of the interruption and/or may extend radially in relation to a center, around which the turns are wound. Advantageously, the interruption may be configured as a rectilinear slot. In the case of a cylindrical coil, the interruption may advantageously extend parallel to the coil axis.

In one advantageous embodiment of the invention, at least one dielectric layer and/or electrically insulating layer may be arranged between the coil and the shield, which layer electrically insulates the coil with respect to the shield.

In another advantageous embodiment of the invention, the passive transponder may have an electrically insulating layer and/or dielectric layer on the shield on the surface facing away from the coil. By way of such a shield, the transponder can be electrically insulated with respect to a surrounding medium. Such a shield is particularly advantageous when using the passive transponder according to the invention in liquid media. Advantageously, the insulating layer completely covers all electrically conductive parts of the transponder.

In one advantageous embodiment of the invention, the coil may be connected to a capacitor to form a resonant circuit. The capacitor may be, for example, a capacitive pressure sensor. In this way, a pressure of a medium can be measured and/or monitored using the passive transponder without having to establish an electrical connection. With particular advantage, the passive transponder may also be a device for measuring a pulse wave velocity as described in EP 2668472 B1.

Wherever there is no interruption, the shield may advantageously comprise or consist of metal foil and/or conductive coating.

In one advantageous embodiment of the invention, the passive transponder may have two of the coils, which may advantageously extend in a common coil plane. With particular preference, the two coils may be formed on a common dielectric support, which at the same time may also act as part of the described electrically insulating layer.

The shield is advantageously configured such that it allows magnetic fields to pass through the coil. Advantageously, it should not weaken or dampen the voltages induced in the coil.

Advantageously, the shield should ensure that the electromagnetic fields remain concentrated close to the coil and do not spread into a medium surrounded the transponder, since otherwise eddy current losses occur.

Suitable materials for the shield are, for example, aluminum, gold, copper, silver and the like.

BRIEF DESCRIPTION OF THE DRAWINGS

The invention will be explained below by way of example and with reference to a few figures. Identical reference signs denote identical or corresponding features. The features shown in the figures can also be implemented independently of the concrete example and can be combined among different examples.

DETAILED DESCRIPTION OF THE INVENTION

Figure 1:
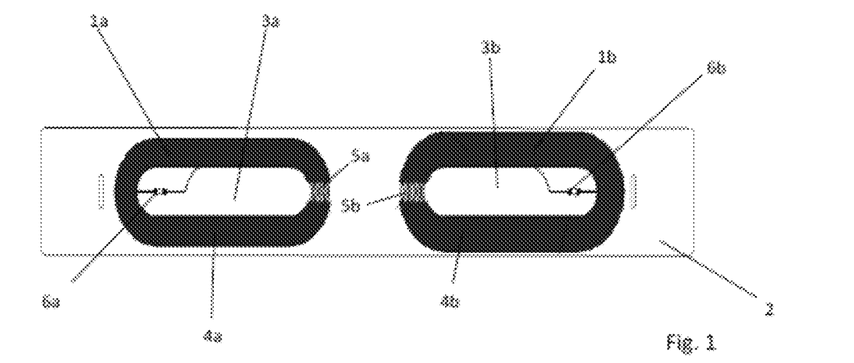
FIG. 1 shows a passive transponder according to the invention.

FIG. 1 shows a passive transponder according to the invention with two coils 1a, 1b.

Figure 2:
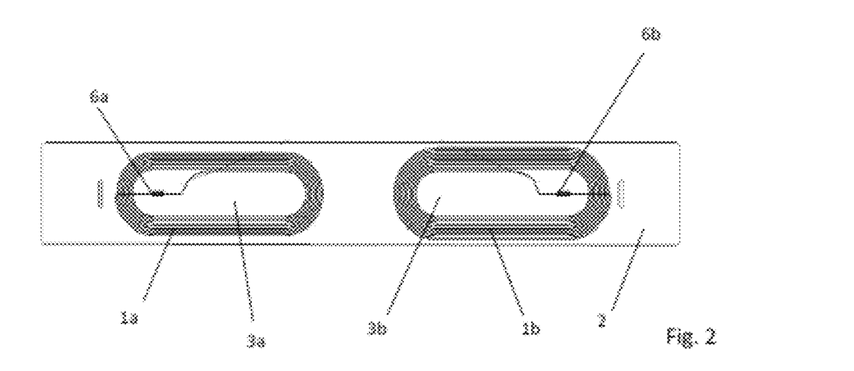
FIG. 2 shows the transponder according to the invention that is shown in FIG. 1, without the shield.

FIG. 2 shows the passive transponder shown in FIG. 1, without shields, so that the course of the coils 1a, 1b can be seen more clearly.

In the example shown in FIGS. 1 and 2, the coils are arranged with a plurality of turns, wound around a central region 3a and 3b, on a carrier substrate 2. As can be seen in FIG. 1, the transponder according to the invention has an electrically conductive shield 4a, 4b for each of the coils 1a, 1b, said shield having been omitted in FIG. 2 so that the turns can be seen. The shields 4a and 4b cover those coil surfaces which face toward the viewer and which are spanned by the turns. The covers 4a and 4b also cover those coil surfaces which face away from the viewer and which are spanned by the turns, said surfaces, in relation to the turns, being located opposite the coil surfaces which face toward the viewer.

The shields 4a and 4b also at least partially do not cover the central region 3a, 3b of the respective coil 1a, 1b, so that a magnetic field can pass through the coils 1a and 1b and in this way can induce a current in the coils 1a and 1b. The shields 4a and 4b each have an interruption 5a and 5b, which here are configured as slots extending non-parallel to the conductor tracks of the coils 1a and 1b in the region of the interruption 5a, 5b. In the example shown, the slots extend perpendicular to the course of the conductor tracks in the region of the interruptions 5a, 5b. In the example shown, the coils 1a and 1b and the shields 4a and 4b have an elongated shape with two rectilinear portions extending parallel to one another, which merge into one another by way of curved portions in the shape of an arc of a circle. In the example shown, the two coils 1a and 1b are and arranged such that in each case two rectilinear portions of the coils 1a and 1b lie on a common straight line. Here, the coil 1a has 9 turns and the coil 1b has 11 turns.

In the example shown in FIGS. 1 and 2, the coils 1a and 1b are each coupled to a capacitor 6a or 6b to form a resonant circuit. The capacitors 6a and 6b may be, for example, capacitive pressure sensors. In the example shown in FIGS. 1 and 2, they are connected in parallel with the inductors of the coils 1a and 1b.

Figure 3:
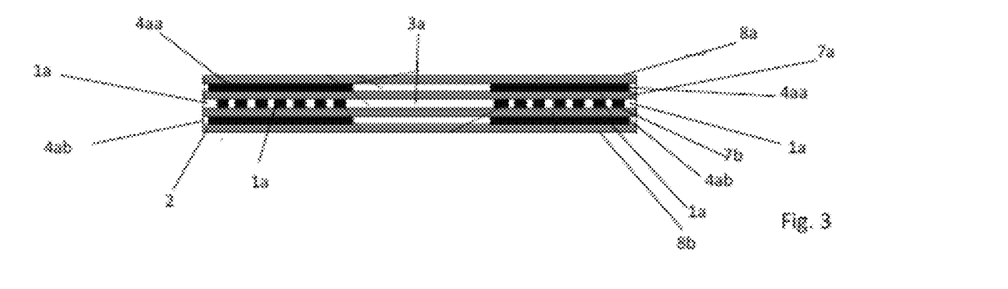
FIG. 3 shows a cross-section through the transponder according to the invention that is shown in FIG. 1.

FIG. 3 shows a section through the embodiment of the passive transponder according to the invention shown in FIG. 1, the section being located in the region of the rectilinear regions of the coil 1a or 1b in a direction perpendicular to the course of said rectilinear regions and perpendicular to the plane of the figure in FIG. 1.

It can be seen in FIG. 3 that the coil 1a is covered by the shield 4a. Here, the shield 4a has two parts 4aa and 4ab, which cover the coil on mutually opposite coil surfaces in relation to the conductor tracks of the coil 1a. In the example shown, the part 4aa covers the upper surface of the coil 1a, and the part 4ab covers the lower surface of the coil 1a.

In the example shown in FIG. 3, the coil has seven turns, which are cut open in the sectional view. The turns of the coil 1a extend around the central region 3a.

In the example shown in FIG. 3, the passive transponder according to the invention has electrically insulating layers 7a and 7b which electrically insulate the coil 1a with respect to the shield 4a. To this end, the electrically insulating layers 7a and 7b are arranged between the coil 1a and the parts 4aa and 4ab of the shield 4a.

The example shown in FIG. 3 also has electrically insulating layers 8a and 8b which are arranged on those surfaces of the shield 4aa and 4ab facing away from the coil 1a and insulate the transponder and the shield 4aa, 4ab with respect to a medium surrounded the transponder.

The blood substitute medium used here is a mixture of 52.4% water, 45% sugar, 1.5% sodium chloride and 0.01 thymol.

The coils 1a and 1b had 11 and 9 windings in the Flex-PCB.

The shield 4a, 4b helps to prevent the electric field from interacting with the surrounding medium. As a result, the parasitic properties of the coil can be influenced such that the latter can perform its function well even in blood. The shield is particularly useful for thin, planar coils, in which the thickness of the coil is a critical parameter. With particular advantage, the coil may be an implantable coil, where the coil is surrounded by body tissues and fluid.

Figure 4:
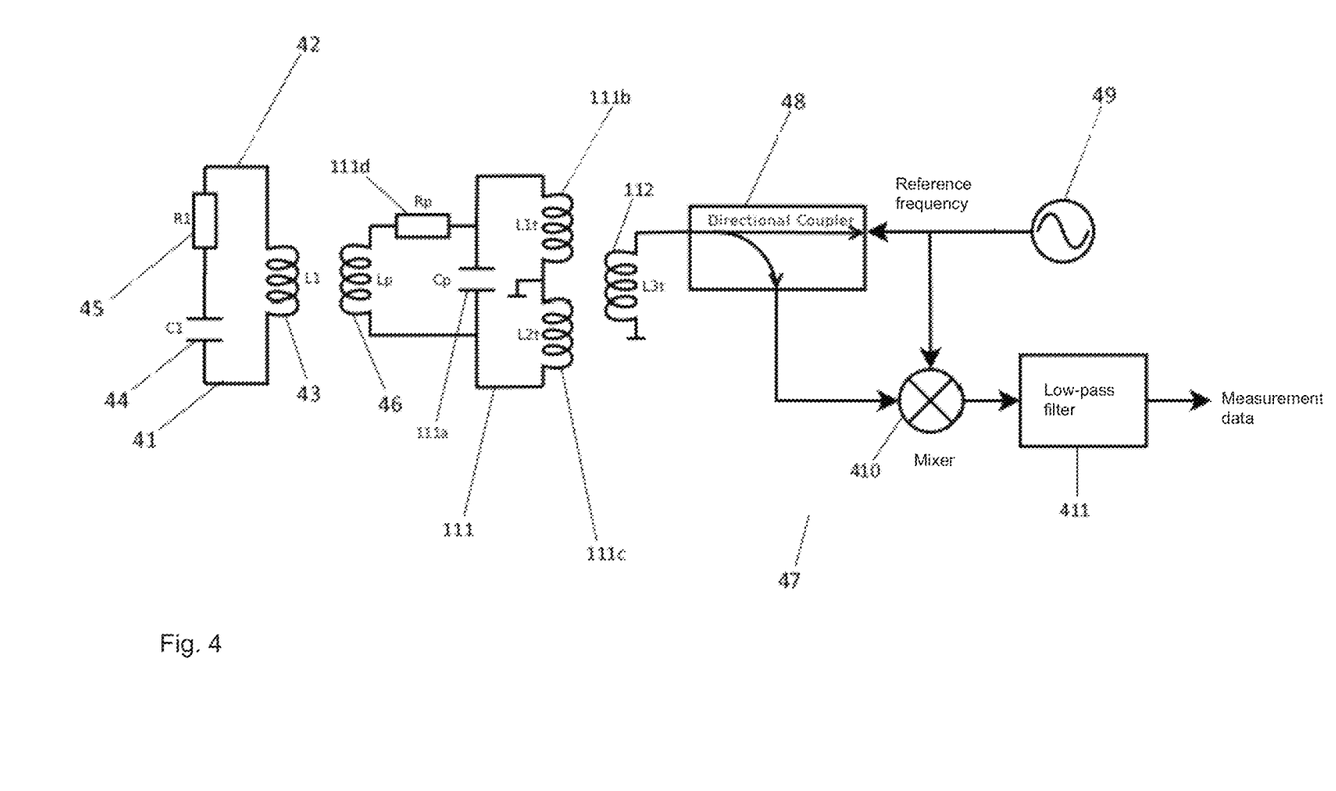
FIG. 4 shows a circuit for reading out from a transponder according to the invention.

FIG. 4 shows an example of a system for reading out from a passive transponder according to the invention. The transponder system comprises a passive transponder 41, which may be configured as described above. As described above, the transponder 41 contains a resonant circuit 42, the resonant frequency of which may be variable, for example if the resonant circuit 42 is configured with a capacitive pressure sensor as the capacitor 44. In the example shown, the resonant circuit 42 has an inductor 43 and a capacitor 44. A resistor 45 is also shown.

The transponder system shown in FIG. 4 also has a readout device 47, which contains a readout inductor 46. Here, the readout inductor is connected to an optional balun transformer 111, which can convert the non-ground-referenced signal of the readout coil 46 (a symmetrical signal) into a ground-referenced signal. The signal generated by the balun transformer 111 is then transmitted here to a secondary coil 112, which generates a signal that is fed into a ground-referenced input of a directional coupler 48. In the example shown, the readout coil has a parasitic capacitance 111a. A resistor 111d is shown between the readout coil 46 and the parallel connection of the parasitic capacitance 111a. Said resistor represents the parasitic resistance of the readout coil. The inductors 111b and 111c are connected in parallel with the readout coil 46.

A signal source 49 for generating an AC voltage signal with a predefined frequency is connected to an output of the directional coupler 48. Arranged at a second output of the directional coupler is a mixer 410, which mixes a signal that enters the directional coupler 48 from the readout inductor 46 or the balun transformer 111 and exits through the second output with the AC voltage signal generated by the signal source 49. The signal output from the mixer 410 is fed to a low-pass filter 411, by which for example noise and interference components are filtered out. The signal output from the low-pass filter 411 can be used as a measurement signal. This can be fed to a sensor, by which the amplitude and/or phase of the signal received from the readout coil 46 can be determined from the signal output from the low-pass filter 411. The sensor 412 may optionally also convert a complex signal output from the low-pass filter 411 into a real signal, which is then used for control purposes.

If the passive transponder 41 has only one resonant circuit, the signal source 49 for reading out from the resonant circuits 42 can generate a single sine signal with a given frequency. If the passive transponder 41 optionally has a plurality of resonant circuits 42, these may advantageously have different frequencies from one another. In this case, the signal source 49 can advantageously generate a signal in which a number of sine functions corresponding to the number of different resonant circuits 42 and having the different frequencies of the plurality of resonant circuits 42 are superimposed. The different frequencies can be read out using the readout coil 46. Preferably, the signal output from the directional coupler 48 to the mixer 410 is in this case mixed with the sine signals having the different resonant frequencies separately. To this end, advantageously a corresponding number of separate mixers 410 may be provided. Each of the separate signals thus generated can then be fed to a low-pass filter 411 and to a sensor 412, which in each case determines the amplitude and/or phase for all the components. For all the frequency components, separate feedbacks to the signal source 49 may then take place. If the passive transponder 41 has a plurality of resonant circuits with different resonant frequencies, preferably a separate mixer 410, a separate low-pass filter 411 and a separate signal source 49 is provided for each of the resonant frequencies. In addition, an adder may be provided, which superimposes the signals generated by the actuators 49 and outputs these jointly to the directional coupler 48. An embodiment with two resonant circuits 42 is particularly advantageous, since this makes it possible to measure pressure wave velocities.

Figure 5:
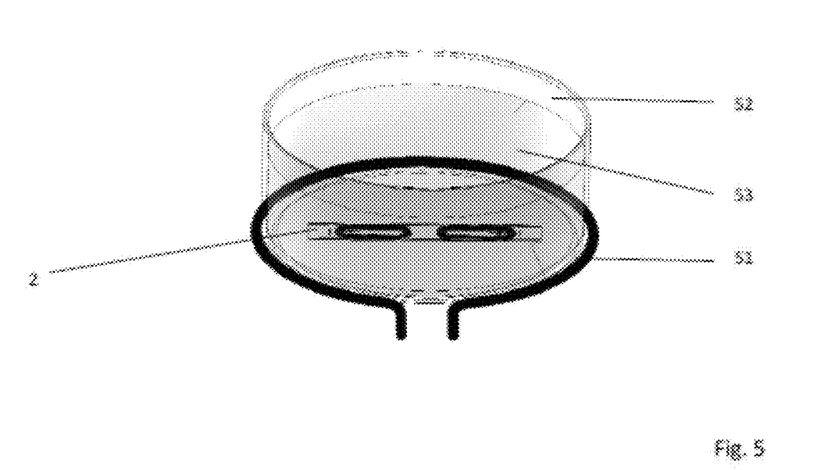
FIG. 5 shows an example of a measurement set-up for reading out from a transponder according to the invention.

FIG. 5 shows an example of a device for reading out from a transponder according to the invention in a test environment. Here, the transponder according to the invention with its carrier substrate 2 and the coils 1a and 1b is arranged in a circular ring-shaped readout coil 51, namely such that the coils 1a and 1b extend in the same plane as the one turn of the readout coil 51. Here, the transponder is arranged on the bottom of a glass beaker 52, which is surrounded by the turn 51 of the readout coil. The glass beaker is filled with a blood substitute 53 as the surrounding medium.

Figure 6:
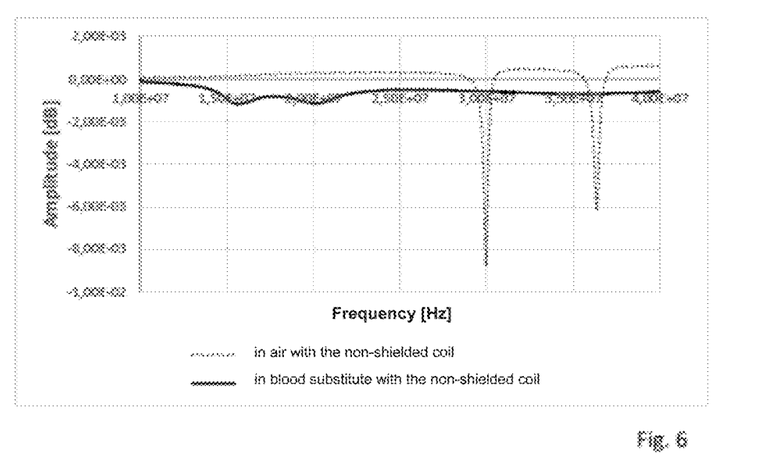
FIG. 6 shows a signal quality of a passive transponder with a non-shielded coil in air and in blood substitute.

FIG. 6 shows, as the measurement result in the set-up shown in FIG. 5, an amplitude of a signal coming from the passive transponder, wherein the coil of the transponder is not shielded, as shown in FIG. 2. Here, the dotted line is a measurement in which the transponder is surrounded by air, and the solid line is a measurement in which the transponder is surrounded by blood substitute. It can be seen that the transponder in air shows a pronounced resonance signal at approximately 30 and 36.5 MHz. In contrast, when the transponder is surrounded by blood substitute, only very weak resonance signals can be seen at approximately 16 MHz and 20 MHz.

Figure 7:
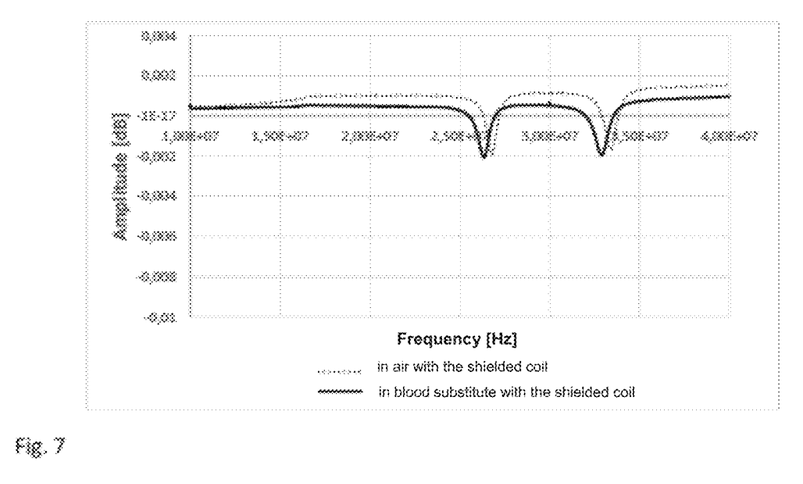
FIG. 7 shows a signal quality of a transponder according to the invention in air and in blood substitute.

FIG. 7 shows the amplitude of the signal coming from the transponder, wherein here the transponder is shielded as shown in FIG. 1, that is to say is a transponder according to the invention. Once again, the dotted line represents the transponder in air, and the solid line represents the measurement of the transponder in blood substitute. Similar resonances can now be observed in both cases at frequencies of approximately 26.5 MHz and 33 MHz, these being pronounced to an approximately equal extent in air and in blood substitute.

FIGS. 6 and 7 each show two resonance peaks, since the transponder in the example shown has two resonant circuits with different resonant frequencies. To sum up, it can be seen that the transponder without a shield has a high signal strength and a high quality factor in air. In blood substitute, however, the signal quality and the quality factor of the non-shielded coil are considerably lower than in air. The resonant frequency decreases significantly compared to the measurement in air, which can be attributed to the electrical properties of the blood substitute medium. The signal-to-noise ratio is very low. This can clearly be seen in FIG. 6.

The shield leads to a somewhat lower signal strength and to a shift in the resonant frequency. This can be further reduced by optimizing the distance between the shield and the coil surface and also the distance between the coil turns. However, it can be seen that in blood substitute the signal quality is considerably better than in the case without the shield. The quality factor is never comparable to the measurement in air.

Figure 8:
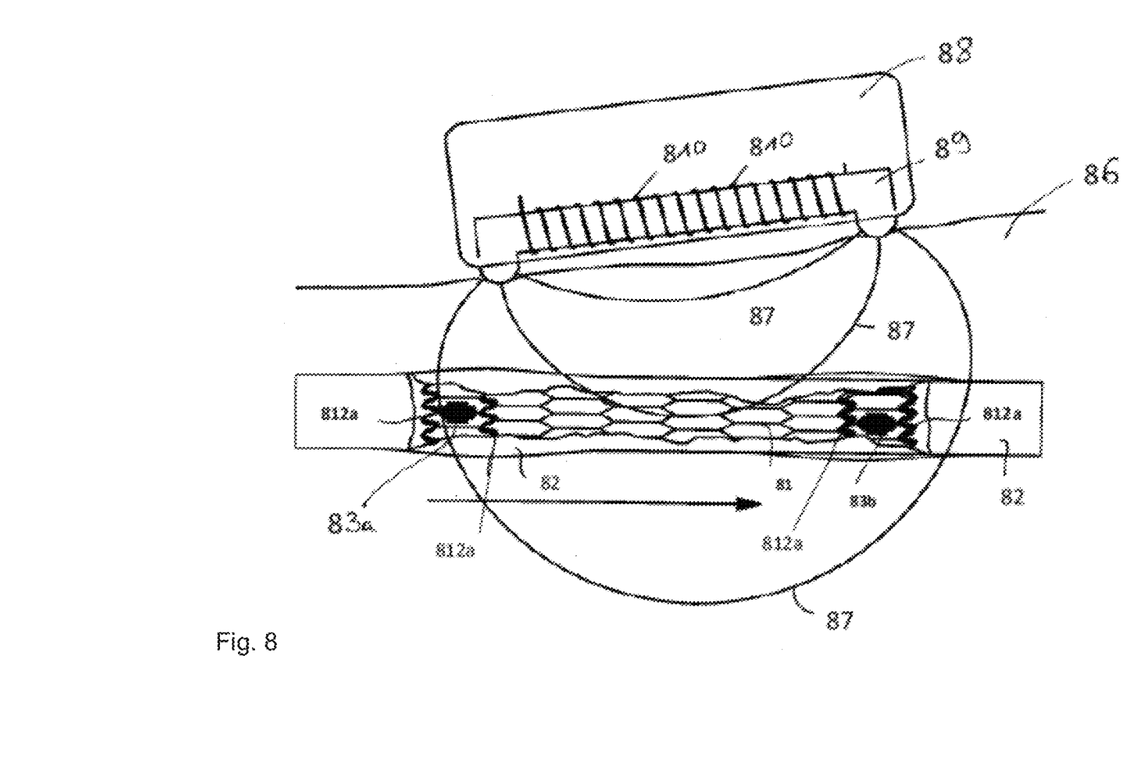
FIG. 8 shows a transponder according to the invention which is configured as a pulse wave velocity measuring device.

FIG. 8 shows a cylindrical device for the passage of fluid.

In the example shown in FIG. 8, the passive transponder 81 is a stent 81 which is arranged in a blood vessel 82. The stent 81 has two capacitive pressure sensors 83a and 83b, which are arranged at different locations along a cylinder axis of the stent 81 and by which the pressure of the fluid inside the stent 81 can be measured at different locations along the cylinder axis. The capacitors of said pressure sensors 83a and 83b are each connected to an inductor 812a, 812b to form a resonant circuit 811a, 811b in each case. It is a property of the capacitive pressure sensors 83a, 83b that the capacitances of the pressure sensors 83a, 83b depend on the pressure of the fluid at the measurement location. If the capacitance of the respective pressure sensor 83a, 83b changes, then a resonant frequency of the corresponding resonant circuit changes. The pressure sensors 83a, 83b or the corresponding resonant circuits have an antenna or a region acting as an antenna (a coil) and can therefore be excited to oscillate by means of an electromagnetic field from outside the line 82. Here, the coils 812a and 812b are provided with a shield 4, as described above, but said shield is not shown in FIG. 8 for the sake of better clarity.

By means of an evaluation unit 88, an alternating electromagnetic field 87 can then be generated, by which the resonant circuits of the pressure sensors 83a, 83b can be excited to oscillate. Here, the electromagnetic field contains alternating fields with the resonant frequencies of the resonant circuits of the pressure sensors 83a and 83b. In the example shown in FIG. 8, the electromagnetic field 87 is generated by means of a coil 810, which is wound around a core 89. To generate the electromagnetic field 87, an alternating voltage is applied to the coil 810, said alternating voltage containing frequency components which correspond to the required frequency components of the electromagnetic field 87.

The evaluation unit 88 forms, together with the cylindrical device 81, a pulse wave velocity measuring system according to the invention.

The pulse wave velocity can be measured in various ways using this pulse wave velocity measuring system. The method will be illustrated here based on the example of a flexible line in a technical device.

As described, the resonant circuits of the pressure sensors 83a and 83b can be excited to oscillate by means of the electromagnetic field 87. To this end, the electromagnetic field is generated with resonant frequencies of the resonant circuits. The time at which a pulse wave passes the sensors can then be determined by determining a change in resonance of the respective resonant circuit. As described above, the pulse wave velocity can then be determined from the difference of the change in resonance at the two pressure sensors 83a, 83b.

In one example of the method according to the invention, an impedance of the resonant circuits of the pressure sensors 83a and 83b at the resonant frequency under normal pressure of the fluid in the line 82 can be measured using the evaluation unit 88. When a pressure wave passes one of the pressure sensors 83a, 83b, the resonant frequency of the corresponding resonant circuit changes, as a result of which the impedance of the resonant circuit upon excitation with the resonant frequency under normal pressure decreases. The times at which a decrease in the impedance upon excitation with the resonant frequency under normal pressure, that is to say in the absence of pulse waves, is ascertained can thus be set as the times at which the pulse wave passes.

In an alternative exemplary embodiment of the method, it is possible to vary the frequency of the electromagnetic field 87 in a range which contains the resonant frequencies of the resonant circuits of the pressure sensors 83a and 83b that occur for possible pressures of the fluid. The frequency can then be varied periodically, so that all the frequencies in question are applied to each resonant circuit within one period. The frequencies at which the resonant circuits of the pressure sensors 83a and 83b resonate can then be measured by means of the evaluation unit 88. If the resonant frequency thus determined differs from the resonant frequency of the corresponding resonant circuit under normal pressure, this indicates that a pulse wave is passing the pressure sensor 83a, 83b in question. The time at which the frequency differs from the resonant frequency under normal pressure can therefore be determined as the time at which the pulse wave passes. Here, too, thresholds can once again be used, above which a deviation of the resonant frequency from the resonant frequency under normal pressure is set as the time of passing.

In another embodiment of the method, it is possible to generate, by means of the evaluation unit 88, an electromagnetic field with a wide-band frequency spectrum, the frequency spectrum containing the resonant frequencies in question for all possible occurring pressures of the resonant circuits of the pressure sensors 83a and 83b. Once the electromagnetic field has been switched off, the resonant circuits oscillate and in turn generate alternating electromagnetic fields with frequencies that correspond to their current resonant frequencies. By measuring the frequencies of said fields, therefore, the current resonant frequencies of the resonant circuits can be measured directly. If this measurement is carried out repeatedly, then it is therefore possible to determine times at which the resonant frequencies of the resonant circuits differ from the resonant frequencies under normal pressure. If this difference exceeds a predetermined threshold, the time of said exceeding can be set as the time at which a pressure wave passes. A pressure wave running through the device 81 according to the invention triggers such an event at two consecutive times on the two pressure sensors 83a, 83b. The pulse wave velocity can therefore be determined from the difference between said times and the distance between the pressure sensors 83a, 83b.

The wide-band electromagnetic field may be generated for example as a pulse with a continuous frequency spectrum.

The invention claimed is:

1. A passive transponder,
    having at least one coil with one or a plurality of turns wound around a central region,
    additionally having at least one electrically conductive shield,
    wherein the shield covers two coil surfaces which are located opposite one another in relation to the turns, said coil surfaces being spanned by the same portions of the turns, wherein the shield at least partially does not cover the central region, and wherein the shield, in each region in which it covers one of the coil surfaces, has at least one interruption which severs the shield in a direction non-parallel to the course of the turns at the site of the interruption, so that a flow of current in the direction of the turns can be prevented in said region of the shield, wherein the coil is a cylindrical coil and wherein the shield extends on the one hand over an outer cylinder surface of the cylindrical coil and on the other hand over an inner cylinder surface of the cylindrical coil.

2. The passive transponder according to claim 1, wherein at least one electrically insulating layer is arranged between the coil and the shield, which layer insulates the coil with respect to the shield.

3. The passive transponder according to claim 1, wherein an electrically insulating layer is arranged on the shield on the surfaces thereof facing away from the coil, which layer insulates the shield with respect to a medium surrounding the transponder.

4. The passive transponder according to claim 1, wherein the coil is connected to a capacitor to form a resonant circuit.

5. The passive transponder according to claim 1, wherein the shield, in regions in which there is no interruption, comprises a metal foil and/or a conductive coating.

6. The passive transponder according to claim 1, wherein at least one electrically insulating layer is arranged between the coil and the shield, which layer insulates the coil with respect to the shield.

7. The passive transponder according to claim 1, wherein an electrically insulating layer is arranged on the shield on the surfaces thereof facing away from the coil, which layer insulates the shield with respect to a medium surrounding the transponder.

8. The passive transponder according to claim 1, wherein the coil is connected to a capacitor to form a resonant circuit.

9. The passive transponder according to claim 1, wherein the shield, in regions in which there is no interruption, comprises a metal foil and/or a conductive coating.

10. The passive transponder according to claim 1, having two of the coils, which extend in a common coil plane.

* * * * *